(12) United States Patent
Montalti et al.

(10) Patent No.: US 10,507,415 B2
(45) Date of Patent: Dec. 17, 2019

(54) CLOSURE SYSTEM FOR A FILTER DOOR IN AN INDUSTRIAL EXTRACTION SYSTEM

(71) Applicant: Nilfisk A/S, Broendby (DK)

(72) Inventors: Maurizio Montalti, Valsamoggia (IT); Cesare Bondioli, Zocca (IT)

(73) Assignee: NILFISK A/S, Broendby (DK)

( * ) Notice: Subject to any disclaimer, the term of this patent is extended or adjusted under 35 U.S.C. 154(b) by 122 days.

(21) Appl. No.: 15/241,409

(22) Filed: Aug. 19, 2016

(65) Prior Publication Data
US 2017/0106321 A1 Apr. 20, 2017

(30) Foreign Application Priority Data
Aug. 19, 2015 (DE) .................. 20 2015 005 831 U (51) Int. Cl.
| | | |
|---|---|---|
| *B01D 46/04* | (2006.01) | |
| *B01D 46/42* | (2006.01) | |
| *E05B 65/06* | (2006.01) | |
| *E05D 15/48* | (2006.01) | |
| *E06B 7/28* | (2006.01) | |
| *E06B 5/00* | (2006.01) | |
| *B01D 46/00* | (2006.01) | |
| *E05D 3/02* | (2006.01) | |

(52) U.S. Cl.
CPC ..... *B01D 46/0005* (2013.01); *B01D 46/0004* (2013.01); *B01D 46/0091* (2013.01); *E05B 65/06* (2013.01); *E05D 3/022* (2013.01); *E05D 15/48* (2013.01); *E06B 5/00* (2013.01); *E06B 7/28* (2013.01); *E05D 2015/485* (2013.01)

(58) Field of Classification Search
CPC .... B01D 46/04; B01D 46/42; B01D 46/0068; B01D 2265/02; B01D 46/0005; B01D 46/0004; B01D 46/0091; Y10T 137/86389; E05B 65/06; E05D 15/48; E05D 3/022; E05D 2015/485; E06B 7/28; E06B 5/00
USPC .............. 55/302, 293, 484, 502, 301, 350.1; 95/280, 273; 137/624.11
See application file for complete search history.

(56) References Cited

U.S. PATENT DOCUMENTS

| | | | | |
|---|---|---|---|---|
| 4,637,873 A | * | 1/1987 | DeSousa ............... | E04H 4/1272 210/167.1 |
| 4,894,071 A | * | 1/1990 | Klein .................. | B01D 46/0002 55/351 |
| 6,849,107 B1 | * | 2/2005 | Huffman ............ | B01D 46/0005 250/436 |
| 2002/0020160 A1 | * | 2/2002 | Moore ............... | B01D 46/0005 55/484 |

(Continued)

FOREIGN PATENT DOCUMENTS

| | | |
|---|---|---|
| CH | 708 183 | 12/2014 |
| DE | 27 17 403 | 11/1977 |

(Continued)

*Primary Examiner* — Minh Chau T Pham
(74) *Attorney, Agent, or Firm* — Browdy and Neimark, P.L.L.C.

(57) ABSTRACT

A filter door for closing a filter housing, in an industrial extraction system, wherein the filter door is fastened, with at least two locking elements relative to the housing surface wherein the filter door is pivotally arranged on one side by a slotted guide on the housing surface and is provided with a movable pivot axis. An industrial extraction system is also provided.

20 Claims, 6 Drawing Sheets

(56) References Cited

U.S. PATENT DOCUMENTS

| | | | | |
|---|---|---|---|---|
| 2006/0168893 A1* | 8/2006 | McMakin | ................ | F23J 13/08 49/394 |
| 2010/0181781 A1* | 7/2010 | Nelson | .................. | E05B 63/246 292/198 |
| 2011/0083407 A1* | 4/2011 | Weber | ................ | B01D 46/0068 55/293 |
| 2011/0086589 A1* | 4/2011 | Skrepcinski | ....... | H05K 7/20172 454/184 |
| 2011/0308210 A1* | 12/2011 | Crabtree | ........... | B01D 46/0005 55/483 |
| 2014/0053722 A1 | 2/2014 | Cacciotti | | |
| 2014/0238240 A1* | 8/2014 | Raether | ............. | B01D 46/0041 95/273 |
| 2014/0251133 A1* | 9/2014 | Cacciotti | ............. | B01D 50/002 95/90 |
| 2017/0342887 A1* | 11/2017 | McMakin | ............ | F01N 3/2066 |

FOREIGN PATENT DOCUMENTS

| | | |
|---|---|---|
| DE | 19942483 C1 | 2/2001 |
| DE | 696 11 163 | 7/2001 |
| DE | 102008040594 A1 | 2/2010 |
| DE | 102013020382 A1 | 6/2015 |
| DE | 102014019221 A1 | 6/2015 |
| DE | 102014013818 A1 | 3/2016 |
| WO | 2007/058288 | 5/2007 |

* cited by examiner

CLOSURE SYSTEM FOR A FILTER DOOR IN AN INDUSTRIAL EXTRACTION SYSTEM

FIELD

The invention refers to a closure system for a filter door, in an industrial extraction system.

BACKGROUND

Substances, such as those commonly found in the pharmaceutical industry, require a special device to prevent dispersion of the suction material and thus contact with the operator and the environment. Through the use of special industrial extraction systems with highly efficient extraction solutions, a safe, clean and productive work environment is achieved.

For this particular extraction requirement a high containment filter unit is often used, which is particularly suitable for the extraction of hazardous compounds and substances. The filter system ensures that hazardous, carcinogenic dust, as for example in the case of asbestos or pharmaceutical substances, is filtered from the environment. The main objective of this technology is to avoid any contact with the contained, highly dangerous substances, thereby protecting the operator and the environment from potential risks.

The filter replacement is preferably carried out with the bag-in-bag-out procedure. The maintenance personnel does not come into contact, during the filter replacement, with the contaminated particulate filter. The filter, which is sealed inside a bag, can be removed from the housing of the containment system via a filter door or an access door and may then be disposed of.

To introduce and extract the active substances without any contamination, the system is further equipped with an RTP (Rapid Transfer Port) airlock.

Filter doors and access doors for industrial extraction systems are known from the prior art, which close the opening of the filter housing or the lock in an airtight manner. For this purpose, the loose filter door is connected by a locking means with the housing. The locking means generally consists of a screw, wherein on the cover side preferably four knurled screws are provided and mating threads are present on the housing side.

The main disadvantage of such a filter door is that, after screwing all knurled screws, it is loose and needs to be held with both hands. The cover must therefore first be put aside, in order to subsequently remove the filter with both hands from the filter housing.

Another problem is that the filter housing generally has a circumferential rim which projects from the housing surface. A one-sided pivot bearing for the filter door is therefore not possible, since the pivoting operation of the filter door is hindered by the edge. Likewise, a straight swiveling away or a positioning on the edge of the filter door is not possible.

Therefore, the object is to develop a filter door for an industrial extraction system, so that a simple replacement of the filter element is possible.

SUMMARY

To achieve this object, a filter door is provided for closing a filter housing for at least one filter in an industrial extraction system, wherein the filter door may be pivotably fastened on one side, with at least one locking element relative to the housing surface of the industrial extraction system, wherein the filter door is connected by a slotted guide on the housing surface and has a movable pivot axis and the filter door provides a support surface for the filter.

An essential feature of the invention is that the filter door has a slotted guide by which the filter door is pivotally mounted on one side on the housing surface of the industrial extraction system and further that the pivot axis is displaceable.

A first major advantage is that the user, when replacing the filter, does not have to dismount the filter door, but can use it as a working support for the filter.

The arrangement of the filter door on the housing surface with a slotted guide allows a distance between the filter door and the housing surface, thereby creating the necessary space, which is needed to fold down the filter door.

To this purpose, the housing surface has preferably two guide elements, each having a profiled recess. The filter door has two edge-side pins, which may be inserted into the profiled recesses and which are rotatably and displaceably arranged therein. The profiled recess thus serves as a slotted guide that permits spacing and folding of the filter door relative to the housing.

The pivot axis is thus formed by the two edge-side pins of the filter door and the profiled recess of the guiding element. The mobility of the pivot axis is effected by the relatively long, profiled recesses of the guide elements which guide the two edge-side pins of the filter door and store in rotation.

In one embodiment, the folding of the filter door with respect to the housing surface takes place at an angle between 45° and 135°, preferably of 90°, so that the filter door may be used as (working) table or a shelf. The slotted guide thus serves both as a hinge, as well as a folding limit for the filter door.

By folding down the filter door in a horizontal position, it can thus be used as a working table or shelf for the filter unit. For this purpose, the filter is drawn either alone or together with a substrate (tray) from the filter housing on the folded-down filter door. This represents a significant advantage over the prior art because the filter can be relatively easily removed from the housing and then lifted from the filter door.

The pivot axis of the slotted guide in this case runs horizontally to the (vertically extending) longitudinal axis of the industrial extraction system. However, it is also possible to arrange the slotted guide, and thus the corresponding pins on the filter door on the vertical side surfaces or on the upper horizontal surface in the region of the housing opening. The pivoting action of the filter door is then either left/right or upwards.

In a further preferred embodiment, the slotted guide is arranged on one of the surfaces of the filter door and the pin on the housing surface of the industrial extraction system.

Thus far it has not been possible to fold down the filter door, as the housing of the industry extraction system has a circumferential, collar-like edge in the region of the housing opening so that a folding operation, as well as a safe and accurate placement of the filter door on the housing opening, did not work with an ordinary folding hinge.

Due to the special design of the slotted guide, it is now possible to space the filter door in a first section from the filter housing and then perform the tilting or folding operation in a second section. It is crucial that in all embodiments the filter door can be removed in a straight or parallel orientation from the housing opening and subsequently folded with respect to the housing surface by an angle between 0 and 180°.

In a further preferred embodiment, a bracket-like support frame is disposed underneath the slotted guide in the region of the housing opening, which provides a support for the folding filter door. The bracket can be either fixedly or removably connected to the housing. It is also possible to fold the bracket and lock it in a desired position or angle.

In addition, there is the possibility to position at least one spring between the filter door and the housing, which exerts a force on the filter door during the opening or closing operation.

Further, it is also possible for the slotted guide to pivot vertically, so that the pin can be disengaged. Subsequently, the filter door is presently loose and can be removed from the industrial extraction system.

The inventive subject of the present invention results not only from the subject of the individual claims, but also from the combination of the individual claims with one another.

All information and features disclosed in the documents, including the abstract, especially the spatial configuration shown in the drawings, are claimed as essential to the invention insofar as they are, individually or in combination, new with respect to the prior art.

Where individual items are referred to as "essential to the invention" or "important," this does not mean that these objects must necessarily form the subject of an independent claim. This is determined solely by the current valid version of the independent claim.

The invention is illustrated with reference to only one embodiment illustrative drawings. Here, from the drawings and their description, further inventive features and advantages of the invention can be deduced.

DETAILED DESCRIPTION

Figure 1:
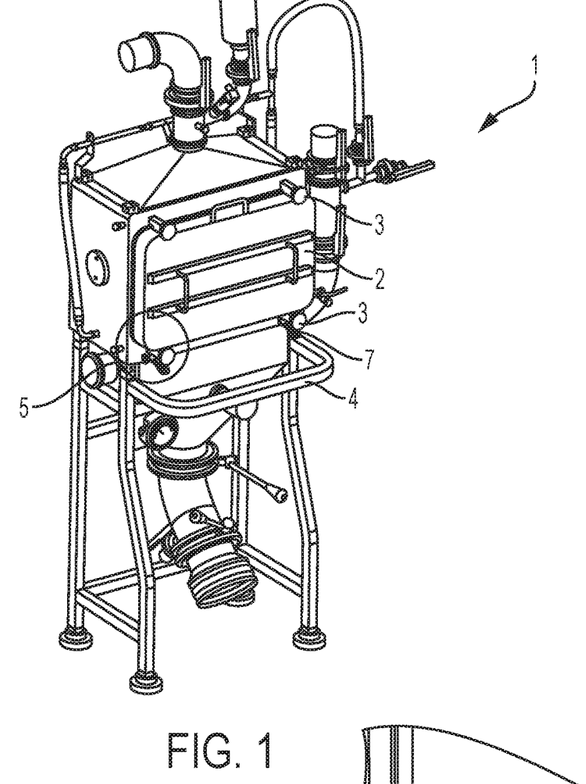
FIG. 1 is a schematic representation of an industrial extraction system with a filter unit.

In FIG. 1, an industrial extraction system 1 is shown, having a filter housing which can be closed and locked via a filter door 2.

The filter housing contains a filter 21, which is formed for example as a HEPA filter 21. The filter is preferably removed by means of a bag (Bag-in & Bag-out method). The filter door 2 is opened and closed with the locking means/element 3.

The locking means 3 are, for example, knurled screws, which cooperate with threads 18 in the region of the opening of the filter door 2 of the industrial extraction system 1.

Furthermore, in FIG. 1, a bracket 4 is shown, which is preferably disposed below the filter door 2 and which serves to support the open filter door 2.

The filter door 2 is connected, in the present embodiment, to the housing of the industrial extraction system 1, not only via the locking means 3 but also via at least one additional filling element 7, which has a profiled recess 8. The recess 8 is provided such that it serves as a slotted guide for a pin 13.

At the filter door 2 preferably two pins 13, not shown, are arranged, which are inserted into the recesses 8 of the guide elements 7, being guided by the recesses.

Figure 2:
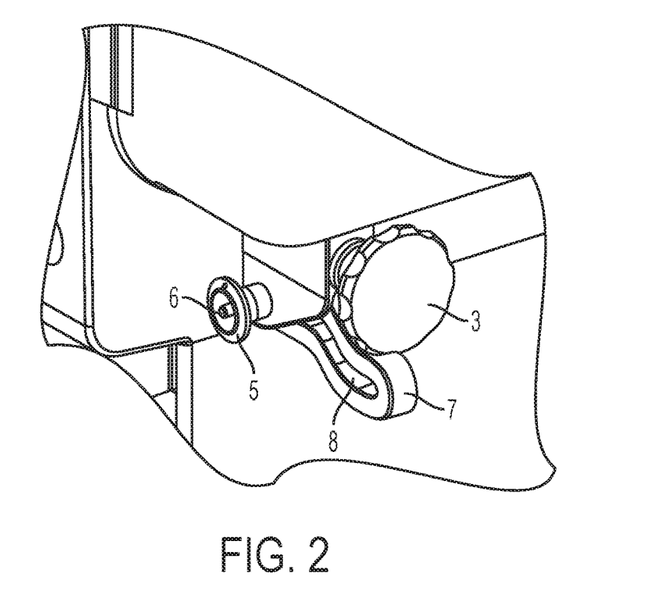
FIG. 2 is a detailed view of the slotted guide (in perspective).

FIG. 2 is a detailed view of the guide element 7 and of its profiled recess 8. Above the guide element 7, the locking element 3 is located, which is provided as a knurled screw. In the present embodiment, the filter door 2 is connected by a total of four locking elements 3 to the thread 18 of the industrial extraction system 1. Of course, less or more than four locking elements 3 are used for securing the filter door 2.

FIG. 2 also shows an actuating means/element 5 comprising a push button 6. By the actuation of the push button 6, a pawl, not shown, is actuated, whereby the pin 13 is released and thus may slide along the recess 8 of the guide element 7. The pawl may be spring-loaded.

The pawl engages in the locked state in a recess of the housing surface 14 and thus secures the filter door 2 against undesired slipping inside the recess 8 of the guide element 7.

If the actuating means 5 is displaced towards the housing surface 14, the pawl opens briefly to then engage the recess of the housing surface 14. The push button 6 thus serves to release the actuating means 5.

The innovation is not limited to the use of a push button and a pawl. It is of course also possible to freely arrange the pin 13 in a movable way within the recess 8 of the guide element 7.

Figure 3:
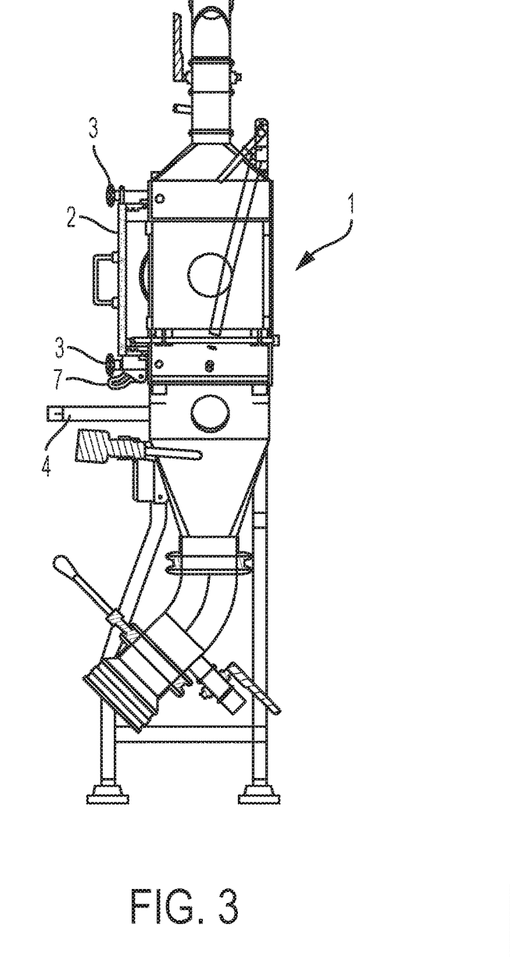
FIG. 3 is a side view of the industrial extraction system of FIG. 1.

In FIG. 3, the industrial extraction system 1 is shown in a side view. The filter door 2 is closed with the locking means 3, wherein the guide element 7 is positioned at the bottom of the filter door 2, which allows a hinge-like folding of the filter door 2 with respect to industrial extraction system 1.

Underneath the guide element 7, the support frame-like bracket 4 is further arranged, which provides a supporting function for the filter door 2 in the open state.

Figure 4:
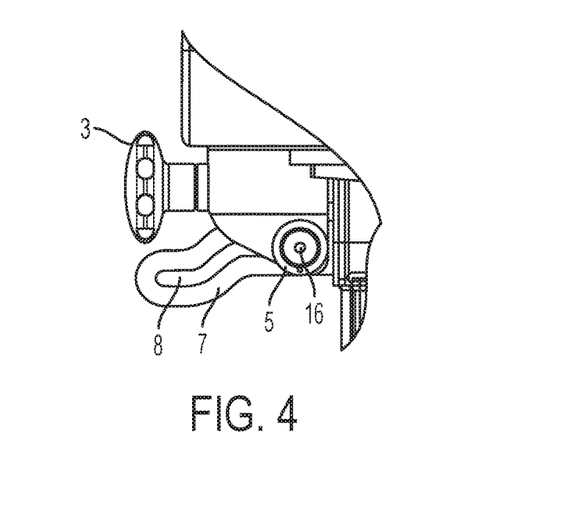
FIG. 4 is a detailed representation of the slotted guide (side view).

FIG. 4 shows a side view of a detailed representation of the guide element 7. The actuating means 5 has a push button 6 for releasing the pin 13. By actuating the push button 6, a force is exerted on the locking pawl, whereby the pawl is swung out of the recess of the housing surface 14, and thus the pin is freely movable within the recess 8 of the guide element 7.

Figure 5:
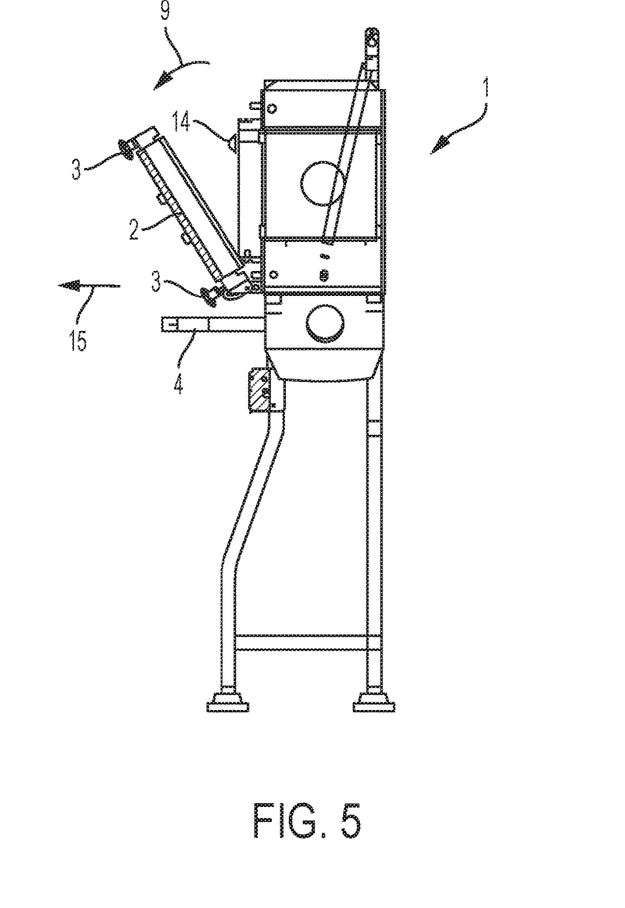
FIG. 5 is a side view of an industrial extraction system with a partially opened filter door.

FIG. 5 shows the industrial extraction system 1 with a partially opened filter door 2. In order to open the filter door 2, the locking means 3 must be released in a first step.

Subsequently, the filter door 2 can now be pulled in the falling direction 15 from the housing surface 14 of the industrial extraction system 1. A guided drawing of the filter door 2 takes place, due to the pins 13, which extend into the profiled recess 8 of the guide element 7.

The recesses 8 of the guide elements 7 are formed such that at first only a relatively straight or horizontal withdrawing of the filter door 2 is possible in the direction of arrow 15. This prevents jamming between the inside of the filter door 2 and the edge of the filter housing 11. In addition, the peripheral seals in the edge region 11 are not damaged.

Particularly in industrial extraction systems 1 a peripheral edge 11 is provided in the area of the filter housing for the filter door 2. This allows the filter door 2 to be only applied on the housing surface 14 in a straight manner.

After the filter door 2 has been removed in direction of the arrow 15 along the recess 8 of the guide element 7, a folding process in the direction of arrow 9 of the entire filter door 2 is possible. The recess 8 of the guide element 7 thus has a dual function. Firstly, a targeted extraction or removing of the filter door 2 is obtained from the edge of the filter housing 11 and on the other hand, the filter door can subsequently be folded.

According to FIG. 5, the filter door 2 can be folded down until it rests on the bracket 4. In the open state, an opening of the filter door 2 with respect to the housing surface 14 at an angle of 90 degrees is thus possible.

Figure 6:
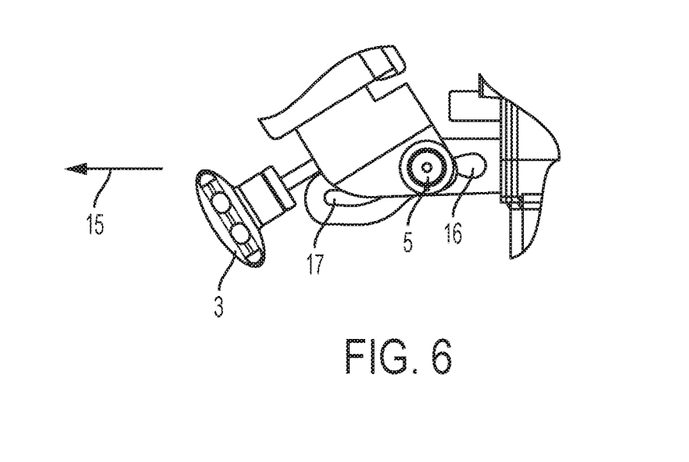
FIG. 6 is a detailed representation of the slotted guide with a partially opened filter door.

FIG. 6 shows a detailed view of the filter door 2 during a movement in the direction of arrow 15. Starting from a position 16 in which the filter door 2 is in its closed position, the actuating means 5 is now pulled in the direction of arrow 15 until a position 17 is reached. In the position 17, a sufficient distance between the filter door 2 and the housing surface 14 has now been reached, so that an unfolding in direction of the arrow 9 can take place.

Figure 7:
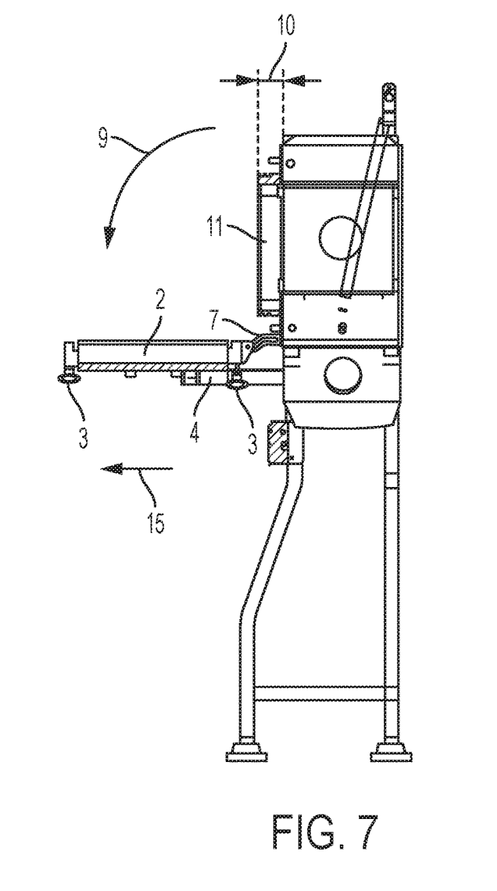
FIG. 7 is a side view of industrial extraction system with an open filter door.
Figure 8:
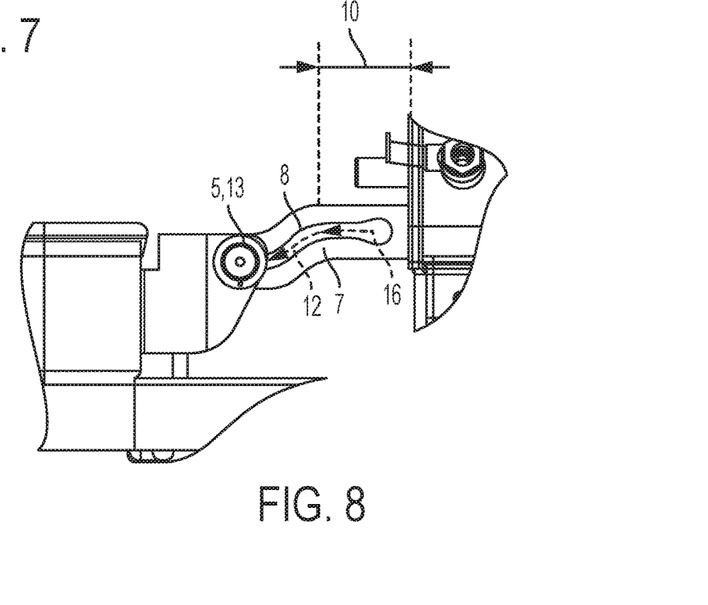
FIG. 8 is a detailed representation of the slotted guide with a fully opened filter door.

In FIGS. 7 and 8, a fully opened filter door 2 is shown. According to FIG. 7, the filter door 2 lies on the bracket 4, which holds the filter door at a 90-degree angle with respect to the housing surface 14.

In FIG. 7, the edge 11 of the filter housing can also be seen, which is positioned at a distance 10 relative to the housing surface 14 of the industrial extraction system. The distance 10 substantially corresponds to the straight portion of the guide element 7. This is also illustrated by FIG. 8, which again shows the profile 12 of the pin 13 of the filter door 2 in the region of the guide element 7 or its recess 8.

The pin 13 is in this case fixedly positioned on the filter door 2 and is guided inside the recess 8 of the guide element 7. Starting from position 16, in which the filter door is in its closed position, in case of an opening process of the filter door 2, the pin 13 is pulled away in the horizontal direction (arrow 15) at a distance 10 from the housing surface 14 of the industrial extraction system. The distance 10 thus corresponds to the depth of the rim of the filter housing 11.

The straight portion of the recess 8 is followed by a 45° inclined portion, which guides the pin 13 relative to the horizontal obliquely in a downwards direction. Meanwhile or afterwards, the filter door 2 can be folded in the direction of arrow 9.

The innovation is not limited to the arrangement of a bracket 4. On the contrary, other locking elements or cursors or the like can be used for fixing the door at a certain angle.

Figure 9:
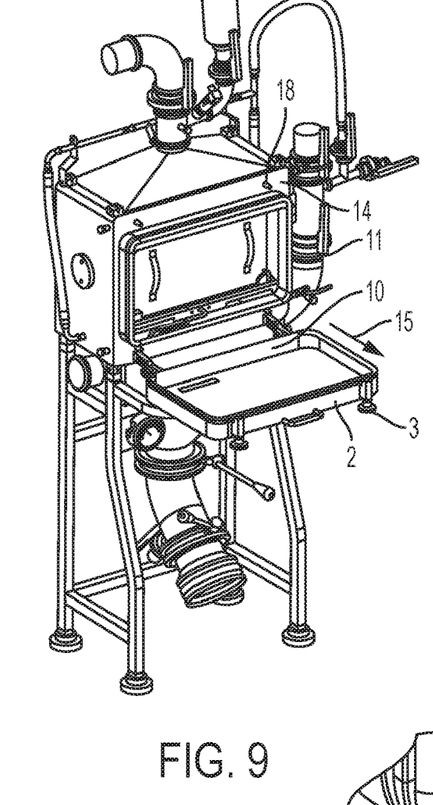
FIG. 9 is a perspective view of the industrial extraction system with an open filter door.
Figure 10:
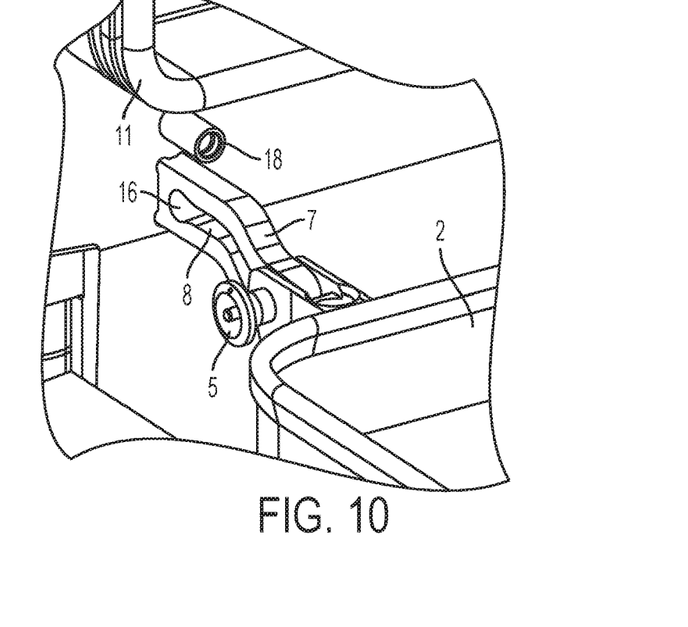
FIG. 10 is a perspective view of the slotted guide with an open filter door.

FIGS. 9 and 10 show the industrial extraction system 1 with an open filter door 2. From FIG. 9, it can be seen that the filter door 2 has a certain internal depth, which approximately corresponds to the depth of the distance 10 of the rim of the filter housing 11.

Furthermore, FIG. 9 shows that the housing surface 14 has a total of four threads 18 for the locking means 3.

FIG. 10 once again shows the guide element 7 with the slot-like recess 8, wherein above guide element 7, thread 18 is shown for securing the filter door 2 to the locking element 3.

Figures 11, 12:
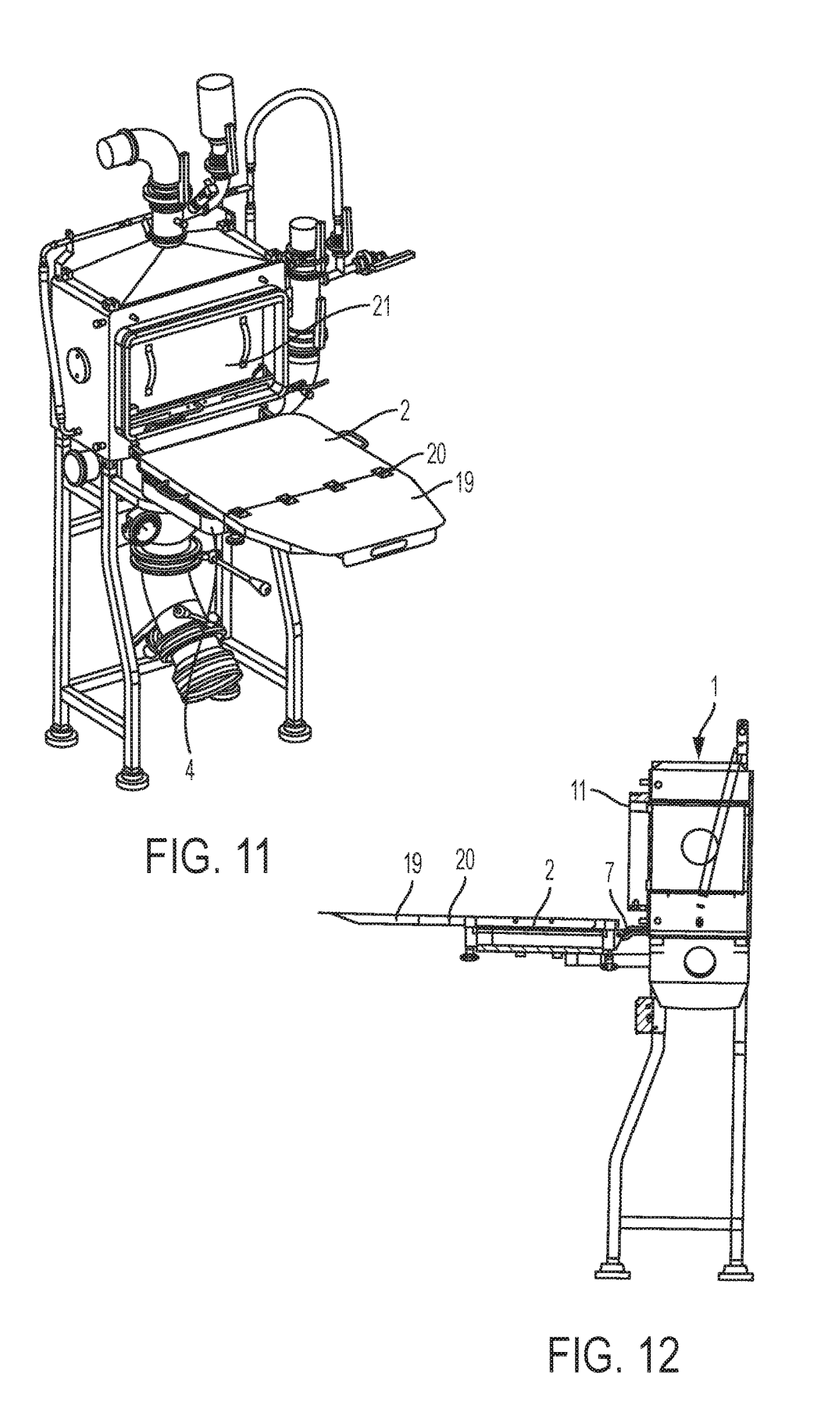
FIG. 11 is a perspective view of the industrial extraction system with filter door and additional tray.
FIG. 12 is a side view of the industrial extraction system with filter door and additional tray.

FIGS. 11 and 12 show a further preferred embodiment of the filter door 2 for an industrial extraction system 1. In this case, the filter door 2 is preferably provided in the edge region with at least one hinge 20, with which an extension 19 in the form of a tablet can be unfolded. Due to the special design of the extension 19 as a tablet, it is now possible to use the filter door as a relatively large working table, which may be necessary in particular when a replacement of filter 21 is required.

FIG. 12 further shows that the working area of the filter door 2 has been significantly enlarged by the extension 19.

In the above embodiments the process of opening the filter door 2 is always addressed. Of course, the inventive embodiment may also be used during the closing process of the filter door 2.

Due to the particularly profiled recess 8, it is possible to fold the filter door 2 on the edge of the filter housing 11 and thereafter, to just (against the direction of arrow 15) insert the filter door 2 on the rim 11 so that the filter door 2 can be attached with the locking means 3 to the industrial extraction system 1.

REFERENCE LIST 1 industrial extraction system
2 filter door
3 locking means
4 bracket
5 actuating means
6 push button
7 guide element
8 recess
9 arrow direction
10 distance
11 edge of the filter housing
12 profile of the pin (13) at opening
13 pin
14 housing surface
15 arrow direction
16 position in the closed position
17 position in the open position
18 thread for 3
19 extension
20 hinge
21 filter

The invention claimed is:

1. A filter door for closing a filter housing for at least one filter in an industrial extraction system, wherein the filter door is pivotably fastened on one side, comprising: at least one locking element to lock the filter door in position relative to a housing surface of the industrial extraction system, the filter door is connected by a slotted guide on the housing surface and has a movable pivot axis to enable the filter door to be opened downwardly so that when the filter door is open, an inner side of the filter door serves as a support surface for the filter, and the filter door is placed on an edge of a filter housing and the edge is positioned at a distance relative to the housing surface and the guide element has a substantially horizontal portion having a length corresponding approximately to the distance.

2. The filter door according to claim 1, wherein the slotted guide comprises at least one guide element with at least one profiled recess and wherein the filter door comprises at least one pin which is rotatably and slidably mounted in the profiled recess.

3. The filter door according to claim 1, wherein the slotted guide locks the filter door in an opened state at an angle of 45° to 135° with respect to the housing surface.

4. The filter door according to claim 1, wherein in a region of the housing surface a bracket is arranged, which supports the filter door in an open state.

5. The filter door according to claim 1, wherein the slotted guide comprises at least one guide element with at least one profiled recess, and the profiled recess of the guide element has a nearly horizontal portion having a length corresponding approximately to the distance.

6. The filter door according to claim 1, wherein by using the filter door at least one filter is replaceable using the Bag-in & Bag-out process.

7. A filter door for closing a filter housing for at least one filter in an industrial extraction system, wherein the filter door is pivotably fastened on one side, comprising: at least one locking element to lock the filter door in position relative to a housing surface of the industrial extraction system, the filter door is connected by a slotted guide on the housing surface and has a movable pivot axis to enable the filter door to be opened downwardly so that when the filter door is open, an inner side of the filter door serves as a support for the filter, wherein the filter door in a region of the pivot axis is provided with at least one actuating element which cooperates with a pawl which engages at least one recess in the housing surface and prevents further displacement of a pin.

8. The filter door according to claim 1, wherein the filter door comprises at least one rim-side hinge which is configured to be foldably connected between the filter door and a plate-like extension.

9. The filter door according to claim 1, wherein the slotted guide is disposed underneath the edge of the filter housing.

10. The filter door according to claim 1, wherein, for removing the filter door of the industrial extraction system, the slotted guide is vertically pivotable.

11. An industrial extraction system comprising:
  at least one filter;
  a filter housing for the at least one filter;
  a filter door for closing the filter housing, wherein the filter door is pivotably fastened on one side;
  at least one locking element to lock the filter door in position relative to a housing surface of the industrial extraction system; and
  a slotted guide connected to the housing surface to connect the filter door to the housing surface, the slotted guide having a movable pivot axis to pivot the filter door with respect to the housing surface, to enable the filter door to be opened downwardly so that when the filter door is open, an inner side of the filter door serves as a support surface for the filter,
  wherein the filter door is placed on an edge of a filter housing and the edge is positioned at a distance relative to the housing surface and the guide element has a substantially horizontal portion having a length corresponding approximately to the distance.

12. The system according to claim 11, wherein the slotted guide comprises at least one guide element with at least one profiled recess and wherein the filter door comprises at least one pin which is rotatably and slidably mounted in the profiled recess.

13. The system according to claim 11, wherein the slotted guide locks the filter door in an opened state at an angle of 45° to 135° with respect to the housing surface.

14. The system according to claim 11, wherein in a region of the housing surface a bracket is arranged, which supports the filter door in an open state.

15. The system according to claim 11, wherein the slotted guide comprises at least one guide element with at least one profiled recess, and the profiled recess of the guide element has a nearly horizontal portion having a length corresponding approximately to the distance.

16. The system according to claim 11, wherein by using the filter door at least one filter is replaceable using the Bag-in & Bag-out process.

17. An industrial extraction system comprising:
  at least one filter;
  a filter housing for the at least one filter;
  a filter door for closing the filter housing, wherein the filter door is pivotably fastened on one side;
  at least one locking element to lock the filter door in position relative to a housing surface of the industrial extraction system; and
  a slotted guide connected to the housing surface to connect the filter door to the housing surface, the slotted guide having a movable pivot axis to pivot the filter door with respect to the housing surface, to enable the filter door to be opened downwardly so that when the filter door is open, an inner side of the filter door serves as a support surface for the filter;
  wherein the filter door in a region of the pivot axis is provided with at least one actuating element which cooperates with a pawl which engages at least one recess in the housing surface and prevents further displacement of a pin.

18. The system according to claim 11, wherein the filter door comprises at least one rim-side hinge which is configured to be foldably connected between the filter door and a plate-like extension.

19. The system according to claim 11, wherein the slotted guide is disposed underneath the edge of the filter housing.

20. The system according to claim 11, wherein, for removing the filter door of the industrial extraction system, the slotted guide is vertically pivotable.

* * * * *